(No Model.)
J. P. MILBOURNE.
AUTOMATIC STOCK FEEDER.
No. 285,295. Patented Sept. 18, 1883.
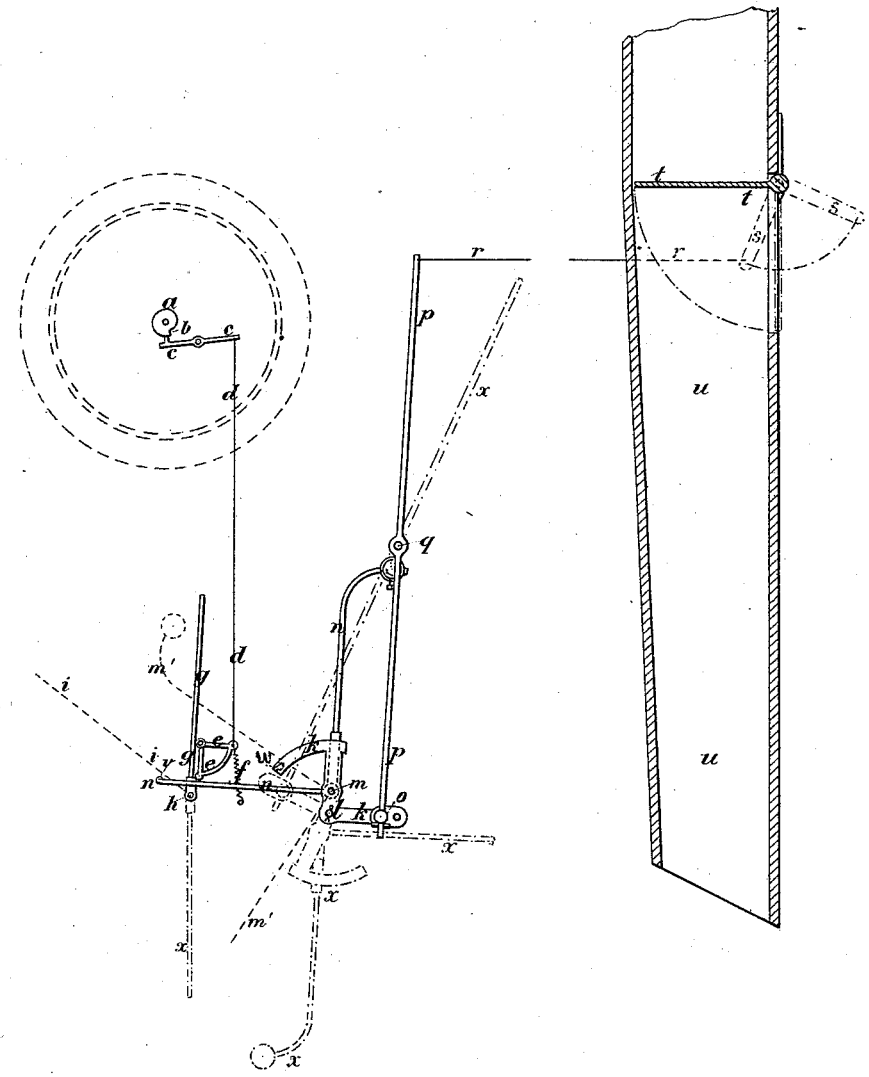
Witnesses.
James J. Tobin
Harry L. Ashenfelter.
Inventor.
John P. Milbourne
by his Attorneys
Howson & Sons

United States Patent Office.

JOHN PARKER MILBOURNE, OF MANCHESTER, COUNTY OF LANCASTER, ENGLAND.

AUTOMATIC STOCK-FEEDER.

SPECIFICATION forming part of Letters Patent No. 285,295, dated September 18, 1883.

Application filed May 4, 1883. (No model.) Patented in England January 4, 1883, No. 51.

*To all whom it may concern:*

Be it known that I, JOHN PARKER MILBOURNE, a subject of the Queen of Great Britain and Ireland, and residing at Manchester, county of Lancaster, England, have invented Improvements in the Construction of Automatic Apparatus for Feeding Horses and other Cattle, (for which I have made application for Letters Patent in Great Britain, No. 51, dated January 4, 1883,) of which the following is a specification.

This invention relates, principally, to the construction of apparatus which can be charged with food at any time, and will at any future definite hour discharge such food into the feeding-trough, so that the attendant can charge the apparatus with food for a number of horses or other cattle—say, overnight—and at any desired time (early in the morning, for instance) the said food will be automatically supplied to the feeding-troughs.

The nature of my invention will be readily understood upon reference to the annexed drawing and the following explanation thereof.

The drawing represents an elevation of the invention shown as applied to a vertical hopper or chute, (drawn in section,) which is fixed above the feeding-trough. Upon the central boss or sleeve of the hour-hand of a clock (represented by the dotted circles) I fit a small cam, $a$, having a gradual rise and a sudden fall or step, $b$, (ordinarily called a "snail-cam,") which cam fits tightly, but is capable of being set so that the position of the fall or step shall correspond to any particular hour at which the food may be desired to be supplied. Against this cam $a$ bears one end of a lever, $c$ $c$, attached by a wire, $d$ $d$, to a bell-crank lever, $e$ $e$, and having a spiral or other spring, $f f$, which draws the lever $c$ $c$ tightly against the cam $a$. A pin projecting from the lower arm of the bell-crank lever $e$ $e$ has resting against it a vertical lever, $g$ $g$, which is inclined slightly to the right of its fixed center, $h$, and as soon as the tooth on the end of the lever $c$ $c$ escapes from the step $b$ of the cam $a$ the spring $f f$ pushes the lever $g$ $g$ past its vertical center, and it then falls into the position indicated by the dotted line $i$ $i$. In connection with the above is a Z-shaped lever, $k$ $k$, mounted upon a fixed center at $l$. Upon a stud, $m$, in the Z-shaped lever $k$ $k$ is also mounted loosely a bell-crank lever, $n$ $n$, the vertical arm of which is weighted; and pivoted to the lower or horizontal arm of the Z-shaped lever $k$ $k$ is a boss, $o$, through which passes loosely the lower arm of a lever, $p$ $p$, mounted on a fixed center at $q$ $q$, and connected at its upper end by a link, $r$ $r$, to a lever, $s$ $s$, fixed on the hinge of the flap $t$ $t$, which closes the chute $u$ $u$ and supports the fodder above it.

The action of the apparatus is as follows: Before the attendant leaves the stable or the cattle-shed at night he first raises the vertical lever $g$ $g$ into the position shown on the drawing and rests it against the small bell-crank $e$ $e$. He then raises the weighted-lever $n$ $n$ up into position, bringing with it the Z-shaped lever $k$ $k$, and by means of the lever $p$ $p$ closes the valve or flap $t$ $t$ in the chute $u$ $u$, after which he places the required amount of fodder on the said valve or flap, and the apparatus is ready for action. It will be observed that the weight of the fodder cannot open the valve or flap $t$ $t$ when the levers are in the position shown, because the direction of the thrust of the lower arm of the lever $p$ $p$ is in a line with the fixed center $l$ $l$ of the Z-shaped lever $k$ $k$. At the appointed time in the morning the action of the clock will have brought the step $b$ of the cam $a$ opposite to the tooth or projection on the lever $c$ $c$. As the tooth escapes this step the spring $f$ will pull down the small bell-crank $e$ $e$, causing it to push the vertical lever $g$ $g$ past its center, when it falls over into the position indicated by the dotted line $i$ $i$, and comes against a finger, $v$, projecting from the end of the horizontal arm of the bell-crank lever $n$ $n$, bringing the weight past the center, when the latter immediately falls over into the position shown by the dotted lines $m'$ $m'$. The upper part of this lever in its turn comes against a finger, $w$, projecting from the end of the curved arm of the Z-shaped lever $k$ $k$, which it pulls over with it into the entirely reversed position shown by the dotted lines $x$ $x$, carrying the lever $p$ $p$ over with it, and by means of the link $r$ $r$ and lever $s$ $s$ opening the valve or flap *t t* and allowing the fodder to fall down the chute *u u* into the feeding-trough.

Where a number of horses or other cattle are to be fed at the same time, each feeding-trough is supplied with its separate hopper and chute, and the valves or flaps of the same are all fixed on a long shaft, so that the falling over of the weighted lever *n n* shall open all the valves *t t* at once.

In cases where the feeding-trough is not supplied from above by a chute, this same apparatus (instead of opening a valve or flap) may be made to open a hinged door, so as to give access to the fodder, which has been previously placed in the feeding trough or manger, which latter in this case is inclosed instead of being open.

When a large number of animals are to be fed at one time, the strength of the apparatus will of course have to be proportioned to the amount of work to be done.

It will also be evident that this apparatus, although only described as applicable to the automatic feeding of animals, may also with equal advantage be applied for other analogous purposes, where it is required to effect the automatic discharge of a certain previously-supplied amount of material at a definite time.

I claim as my invention—

1. The combination of a valve or door and lever *p* controlling the same with a Z-shaped lever, *k*, a weighted lever, *n*, a clock, and intermediate devices, substantially as set forth, for tripping the said weighted lever to operate the valve or door at a determined time, all substantially as described.

2. The combination of a valve or door and a lever, *p*, controlling its movement, with a clock having a cam, a lever, *e*, adapted to be released thereby, a spring, and trip-levers operated through the medium of the said lever *e*, substantially as set forth.

3. The combination of a valve or door and Z-shaped lever *k* to operate the same with weighted bell-crank *n*, levers *g* and *e*, spring, and a clock-operated releasing device, substantially as described.

In testimony whereof I have signed my name to this specification in the presence of two subscribing witnesses.

J. P. MILBOURNE.

Witnesses:
GEORGE DAVIES,
CHARLES DAVIES.